Figure 1:
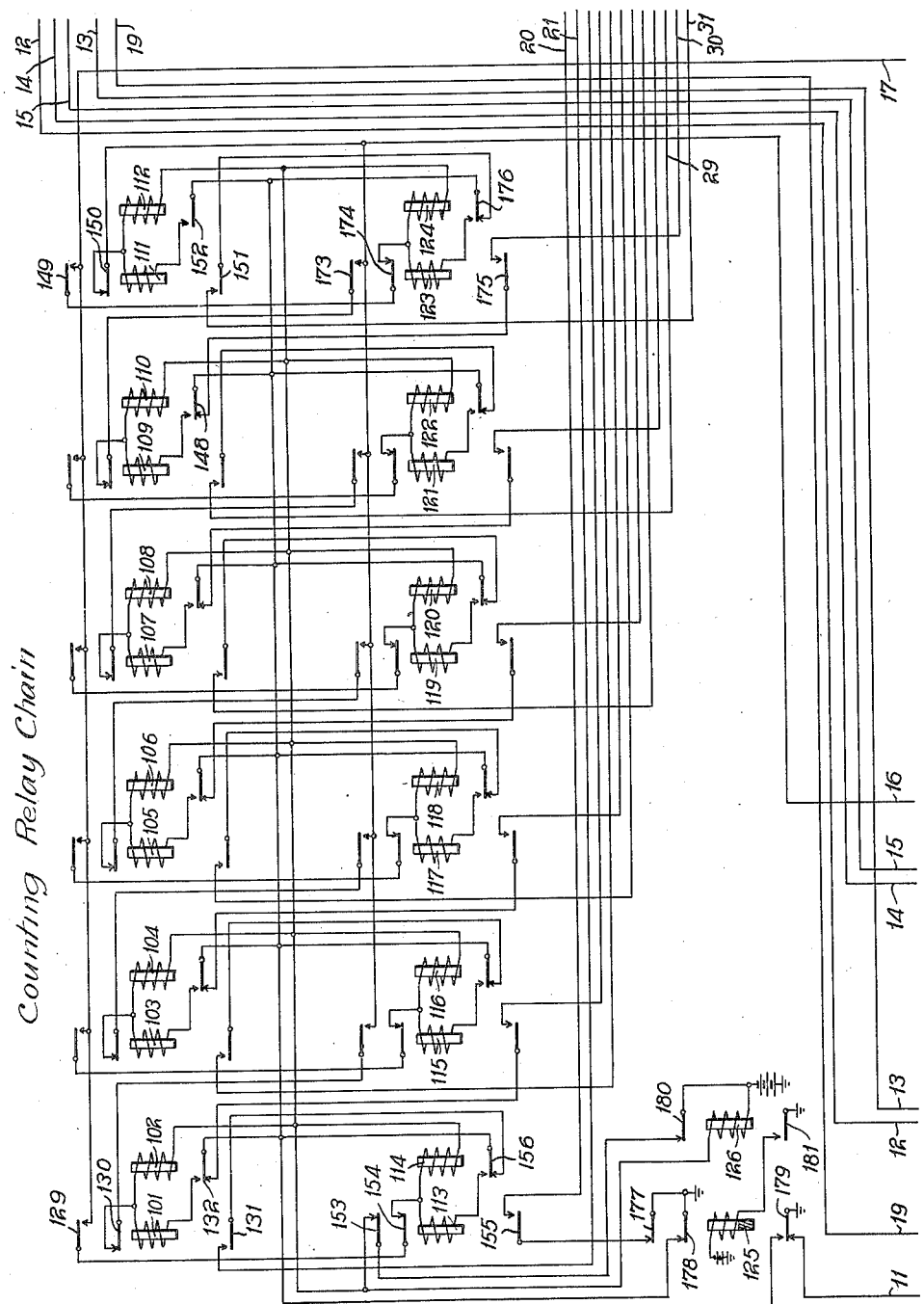

Dec. 24, 1929.  T. U. WHITE  1,740,556
SUPERVISORY CONTROL SYSTEM
Filed June 6, 1924   8 Sheets-Sheet 4

WITNESSES:

INVENTOR
Thomas U. White.
BY
ATTORNEY

Dec. 24, 1929.                T. U. WHITE                    1,740,556
                        SUPERVISORY CONTROL SYSTEM
                   Filed June 6, 1924         8 Sheets-Sheet 7
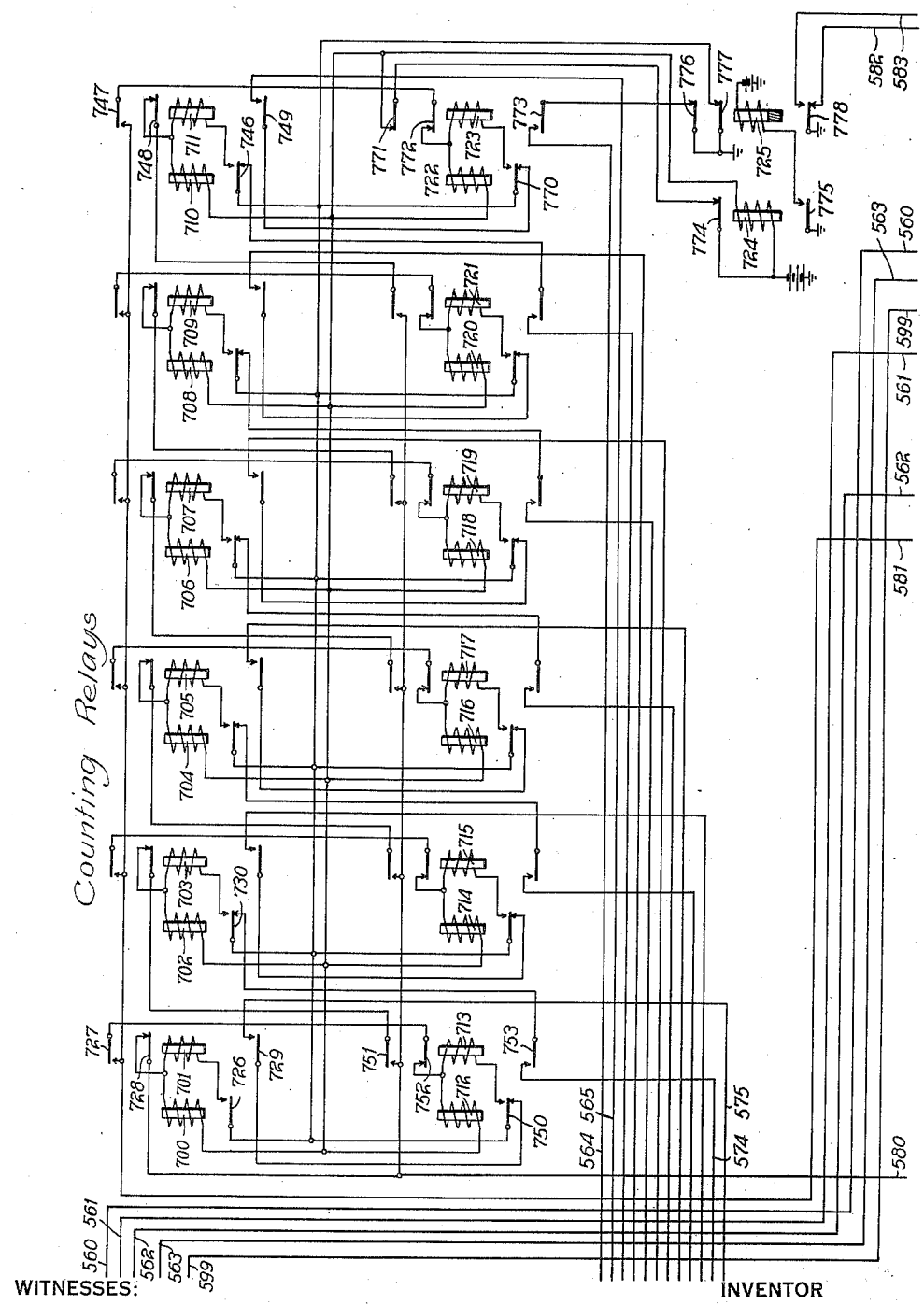
WITNESSES:                                   INVENTOR
                                         Thomas U. White.
                                               BY
                                                 ATTORNEY

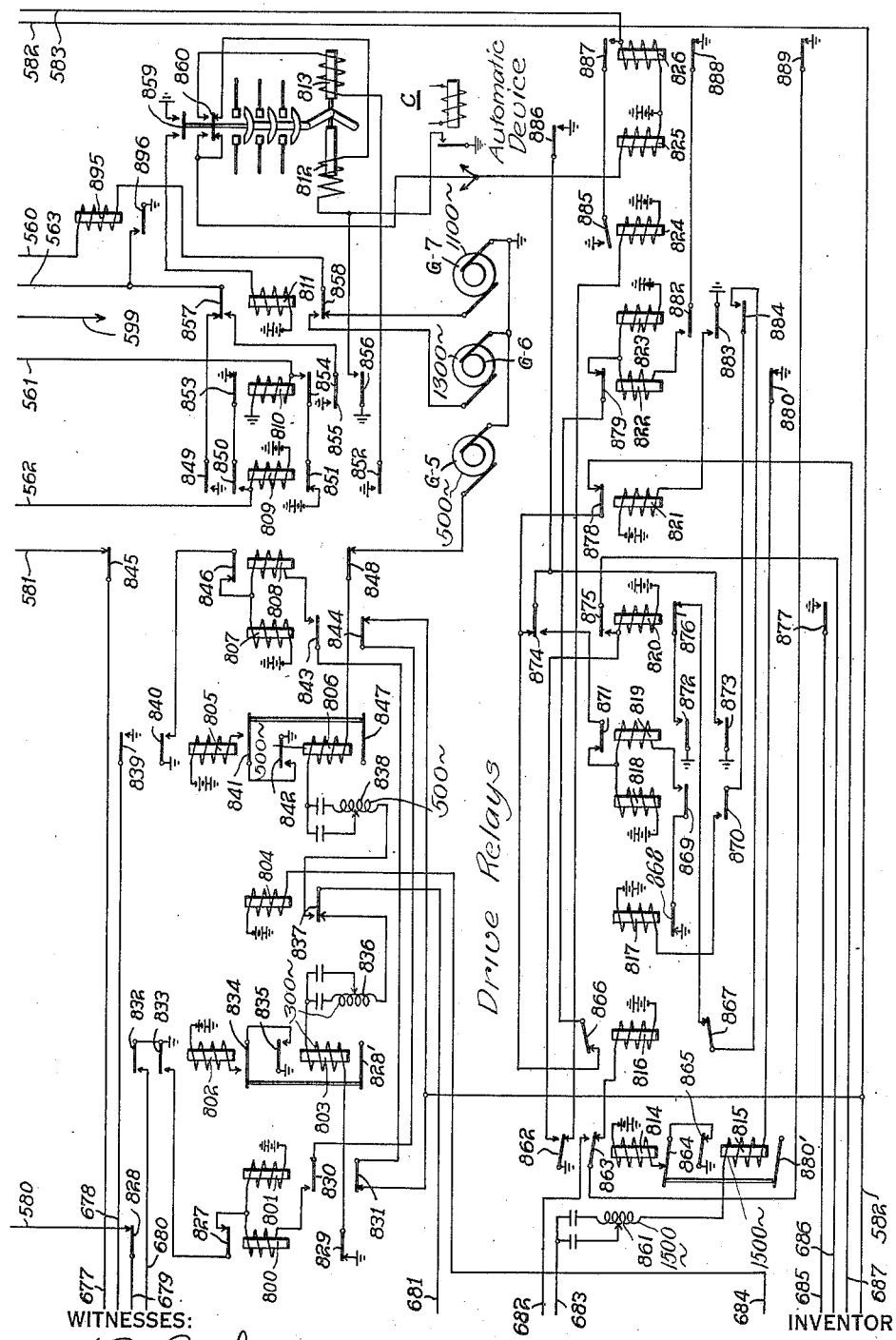

Patented Dec. 24, 1929

1,740,556

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed June 6, 1924. Serial No. 718,359.

My invention relates to supervisory control systems and particularly to systems for supervising and controlling remotely-disposed electrical equipment from a central point or dispatcher's office.

One object of my invention is to provide a supervisory control system that may be operated by means of alternating current.

Another object of my invention is to provide relay chains at the central and distant stations, respectively, that may be operated synchronously by means of alternating currents.

Another object of my invention is to provide a control circuit that is adapted to maintain the relay chains at the central and distant stations operating synchronously by the use of two frequencies of alternating current.

Another object of my invention is to provide improved control means for the electrical apparatus at the distant station and for the supervisory apparatus at the central station that will function in response to alternating currents of different frequencies.

A still further object of my invention is to provide means whereby the number of apparatus units at the distant station accessible to the selective apparatus may be increased at very little additional cost.

There are other objects of the invention which, together with the foregoing, will be described in the detailed specification which is to follow.

Referring now to the drawings, comprising Figures 1 to 8, inclusive, I have shown, by means of conventional diagrams, the apparatus and circuits for carrying out my invention.

The apparatus shown in Figs. 1 to 4, inclusive, is that located at the central station or dispatcher's office, while the apparatus shown in Figs. 5 to 8, inclusive, is that located at the distant station or substation.

In practicing my invention, I provide a chain of counting relays at the dispatcher's office and a chain of counting relays, corresponding in number, at the substation in which are located the apparatus units that it is desired to control and supervise. There are three groups of selecting relays associated with each group of counting relays. In addition, three switching relays are provided for each group of counting relays. A control circuit is located at both the dispatcher's office and station for controlling the operation of the counting relays. The counting relay chains and control circuits are connected together by means of a single conductor trunk line using a ground return.

At the dispatcher's office, a group of keys are provided, these corresponding in number to the number of apparatus units that it is desired to operate. A release key and a control key are located at the office.

In order that the dispatcher may be apprised of the condition of the units in the substation, two signalling lamps are provided for each apparatus unit under supervision. Sources of alternating current of four different frequencies are provided at the dispatcher's office and three sources of alternating current at the substation for controlling the operation of the apparatus units, the supervisory signalling devices and the control circuit, as will appear. Wave filters are also provided at the substation and dispatcher's office for determining the operation of the apparatus in accordance with the frequency in the control and signalling circuits.

When the dispatcher desires to control an apparatus unit at the station or substation, he will operate the key associated with that particular unit in the proper direction, and also the control key. As a result of this operation, the control circuits function to operate the relays in the counting chains in a predetermined sequence. The control circuit is operated by the alternate application of two frequencies of alternating current. Checking means are provided so that, unless the two frequencies of alternating current are applied alternately, the apparatus does not function.

Simultaneously with the first cycle of the counting chains, a switching relay is operated at both the dispatcher's office and substation to connect the relays of one of the auxiliary selecting relay groups and these relays are operated under the control of the counting relays. If the apparatus unit that it is desired to operate is not in this particular group, the counting relay chains will again be operated, the previously mentioned switching relay released and another switching relay at the dispatcher's office and substation will be operated to connect the relays of the second auxiliary selecting groups.

In a like manner, if the apparatus unit desired is not accessible to this group, the third switching relay will be operated and the relays of the third auxiliary selecting group will be connected.

When the proper apparatus unit is selected, alternating current of a predetermined frequency is sent over the conductor connecting the office and substation to operate a relay at the latter point that is included in circuit with the wave filter and that is resonant to that particular frequency. The operation of this relay causes the operation of the selected apparatus unit. In the meantime, the control circuit is prevented from operating and the relay selecting apparatus maintains connection with the desired apparatus unit. When the apparatus unit operates, alternating current of a predetermined frequency is applied to the trunk conductor and a relay, included in circuit with the wave filter, that is resonant to the particular frequency of alternating current applied to the trunk conductor, is operated to control the operation of the signalling devices associated with the selected apparatus unit. The supervisory signalling devices are operated to indicate the change that has taken place in the condition of the apparatus unit at the station. The control circuit again begins to function. After all the relays of the auxiliary selecting relay groups have been operated, the chain restores to normal.

In the event that an apparatus unit at the substation operates under the control of automatic devices responsive to circuit conditions, the operation of the supervisory signals takes place in substantially the same manner as has been described under the control of the supervisory selecting apparatus.

Referring now more particularly to Fig. 1, relays 101 to 124, inclusive, comprise the group of counting relays at the dispatcher's office. Relays 125 and 126 control certain releasing operations.

Figure 2:
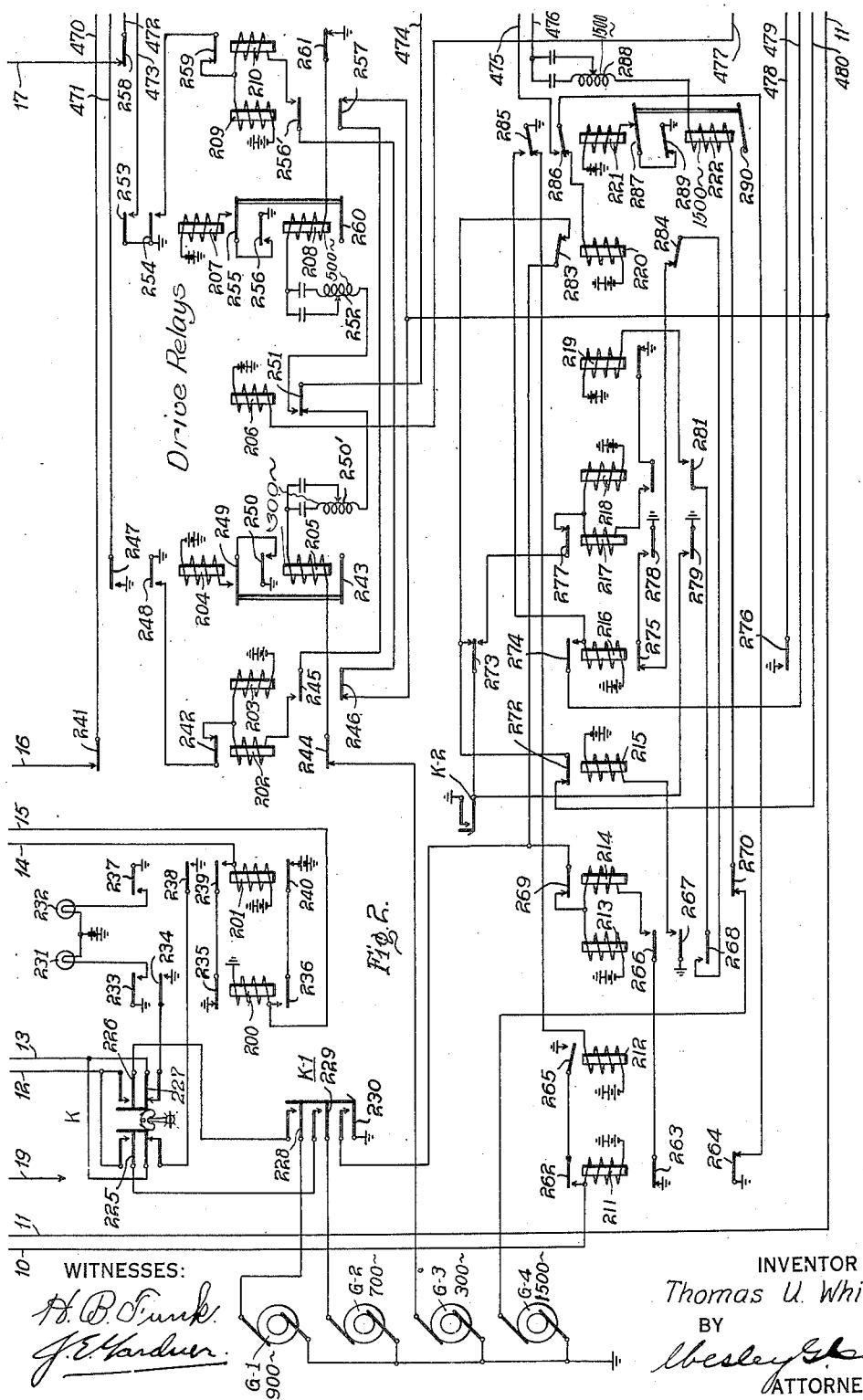

In Fig. 2, a key K is of ordinary double-throw type that locks in its operated position. There is one such key for each apparatus unit that it is desired to control. A key K—1 is of the ordinary single-throw non-locking type. Relays 200 and 201 are provided for controlling supervisory signalling devices 231 and 232.

Generators G—1 to G—4, inclusive, may be of any ordinary type and supply alternating currents of four different frequencies, namely, 900, 700, 300, 1500 cycles, respectively.

Figure 3:
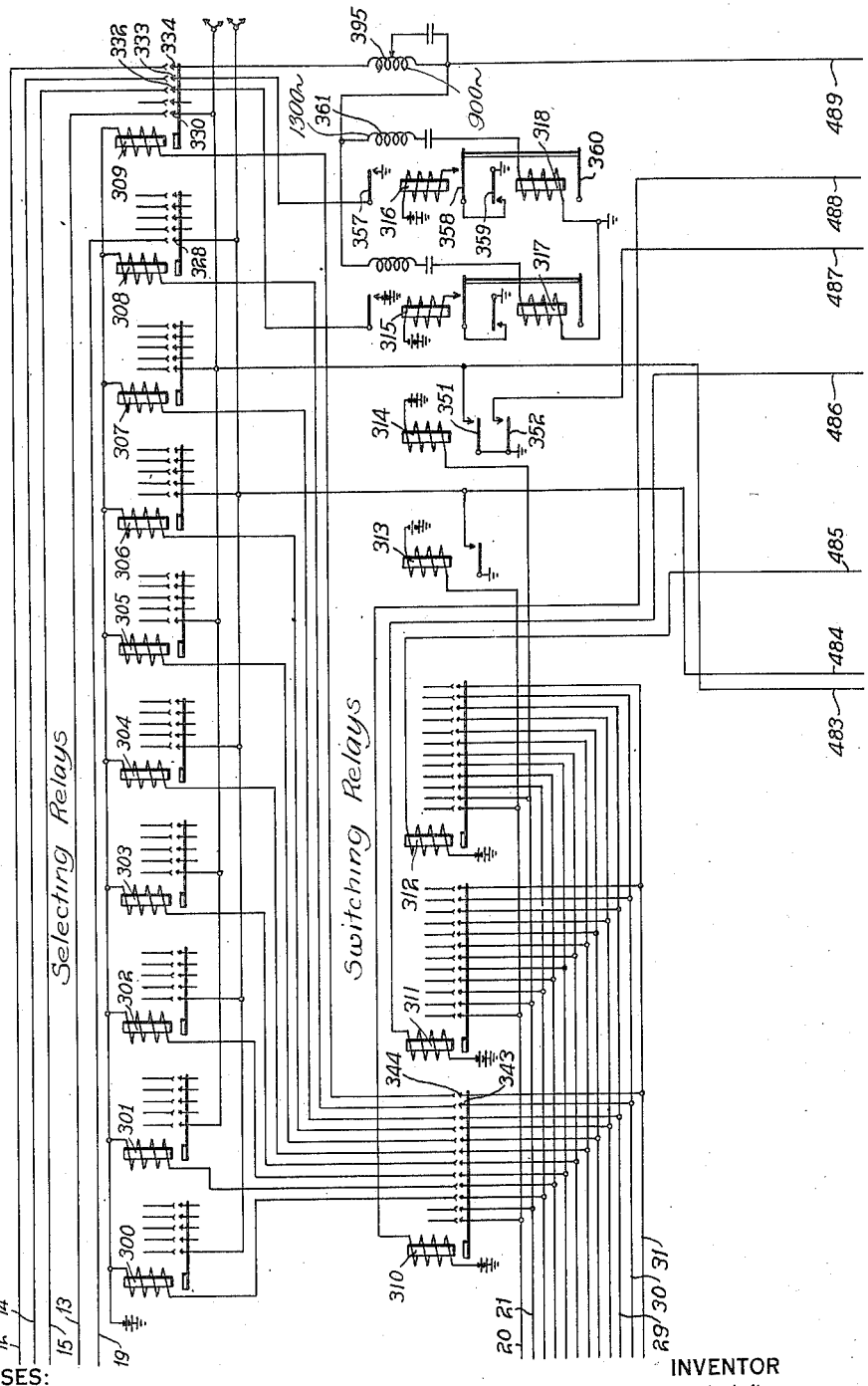
Figure 4:
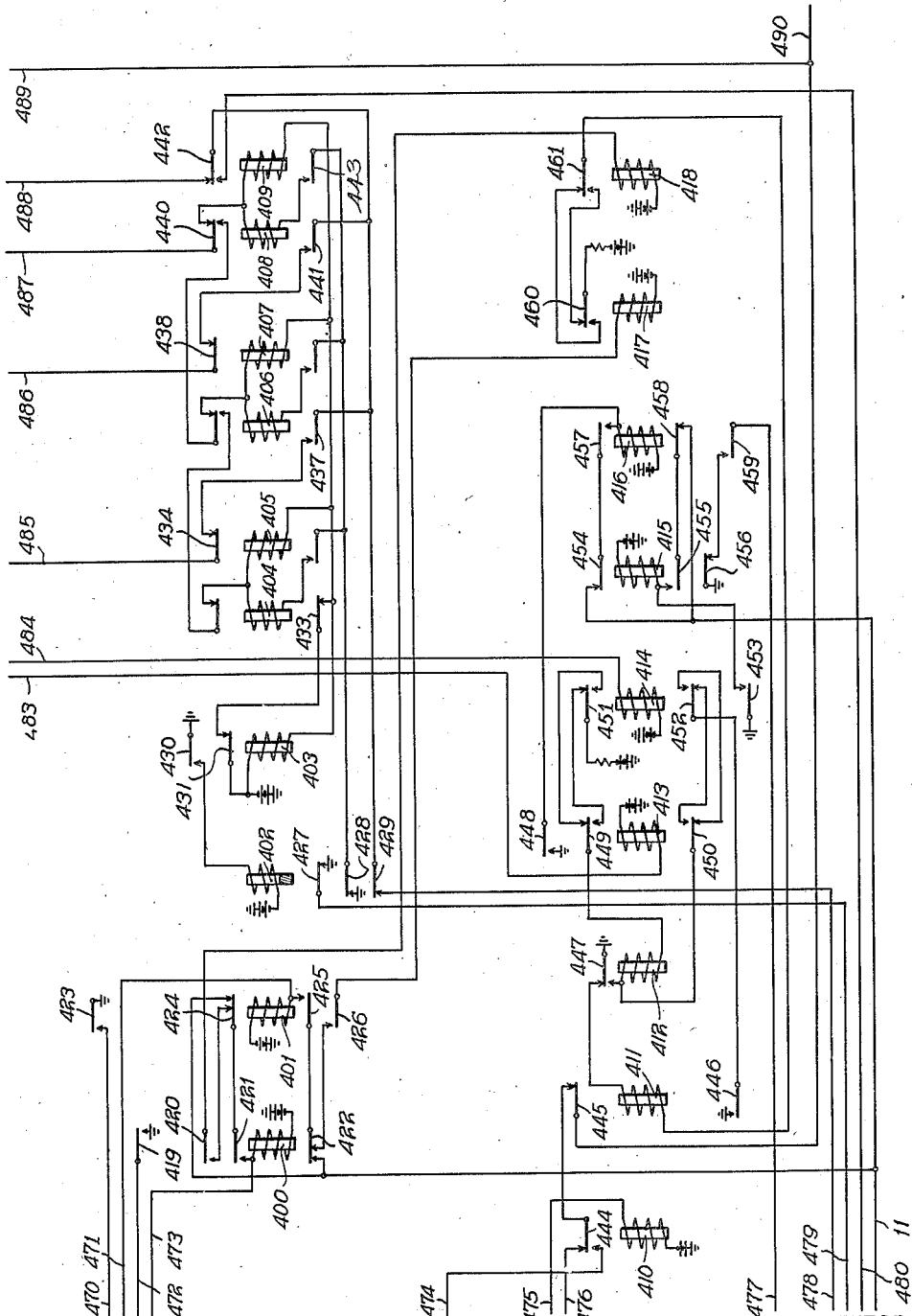

Relays 202 to 222, inclusive, Fig. 2, and relays 400 to 418, inclusive, Fig. 4, comprise the control circuit for controlling the operation of the counting relays and the operation of the switching relays 310 to 312, inclusive, Fig. 3. Relays 313 and 314 are control relays. Relays 315 to 318, inclusive, are associated with the trunk conductor 490 and control the functioning of the apparatus. Relays 300 to 309, inclusive, constitute an auxiliary selecting group of relays. These relays have been shown as multi-contact relays of a particular type. It will be seen that any type of multi-contact relays may be used.

Figure 5:
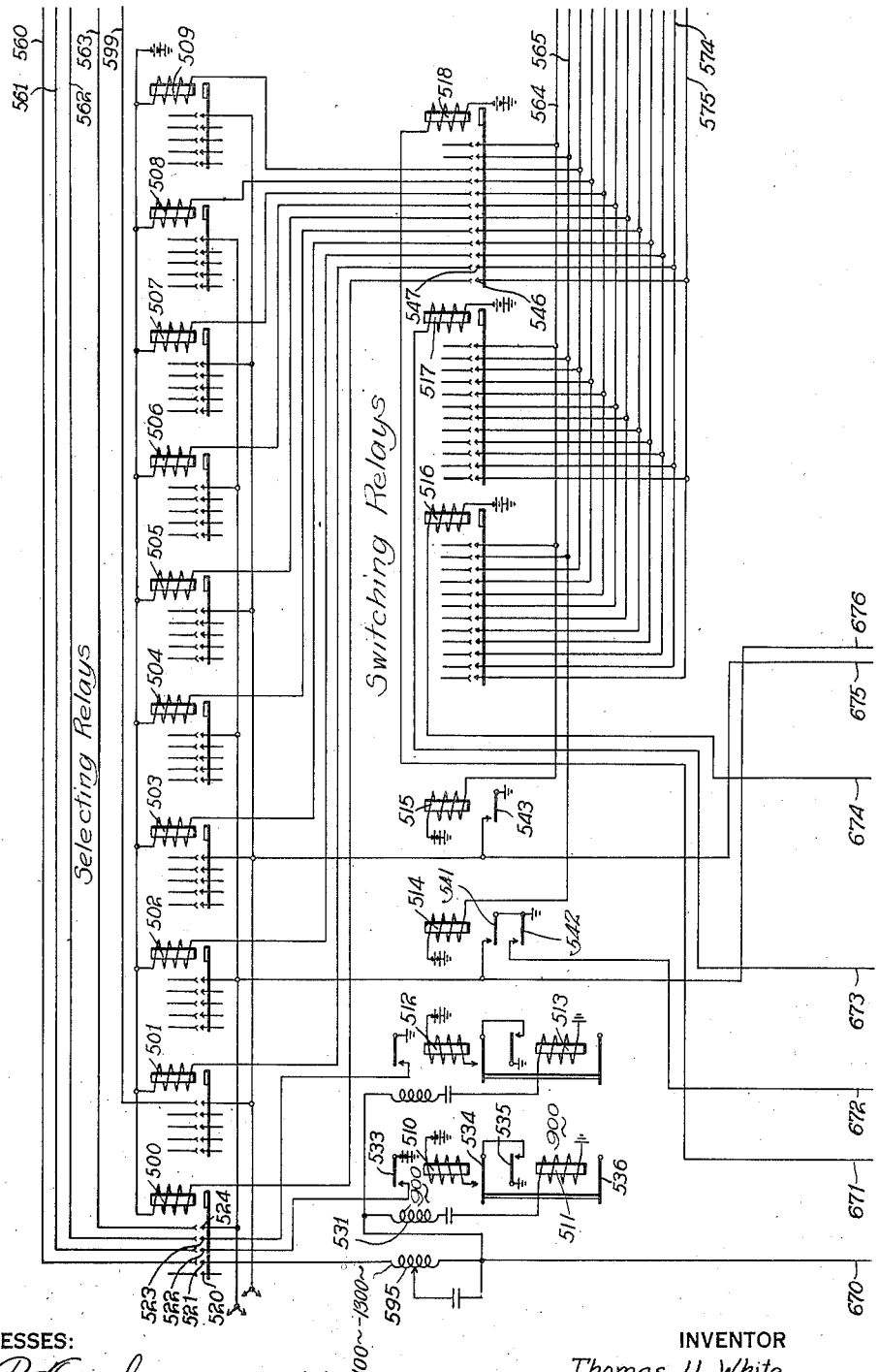

In Fig. 5, relays 500 to 509, inclusive, are the selecting relays of one group. Relays 516 to 518, inclusive, are switching relays for controlling the connection of the selecting relays to the relays of the counting chains. The relays 514 and 515 are control relays. Relays 510 to 513, inclusive, are relays associated with the signalling circuit and control the functioning of the apparatus in a manner to be described.

Figure 6:
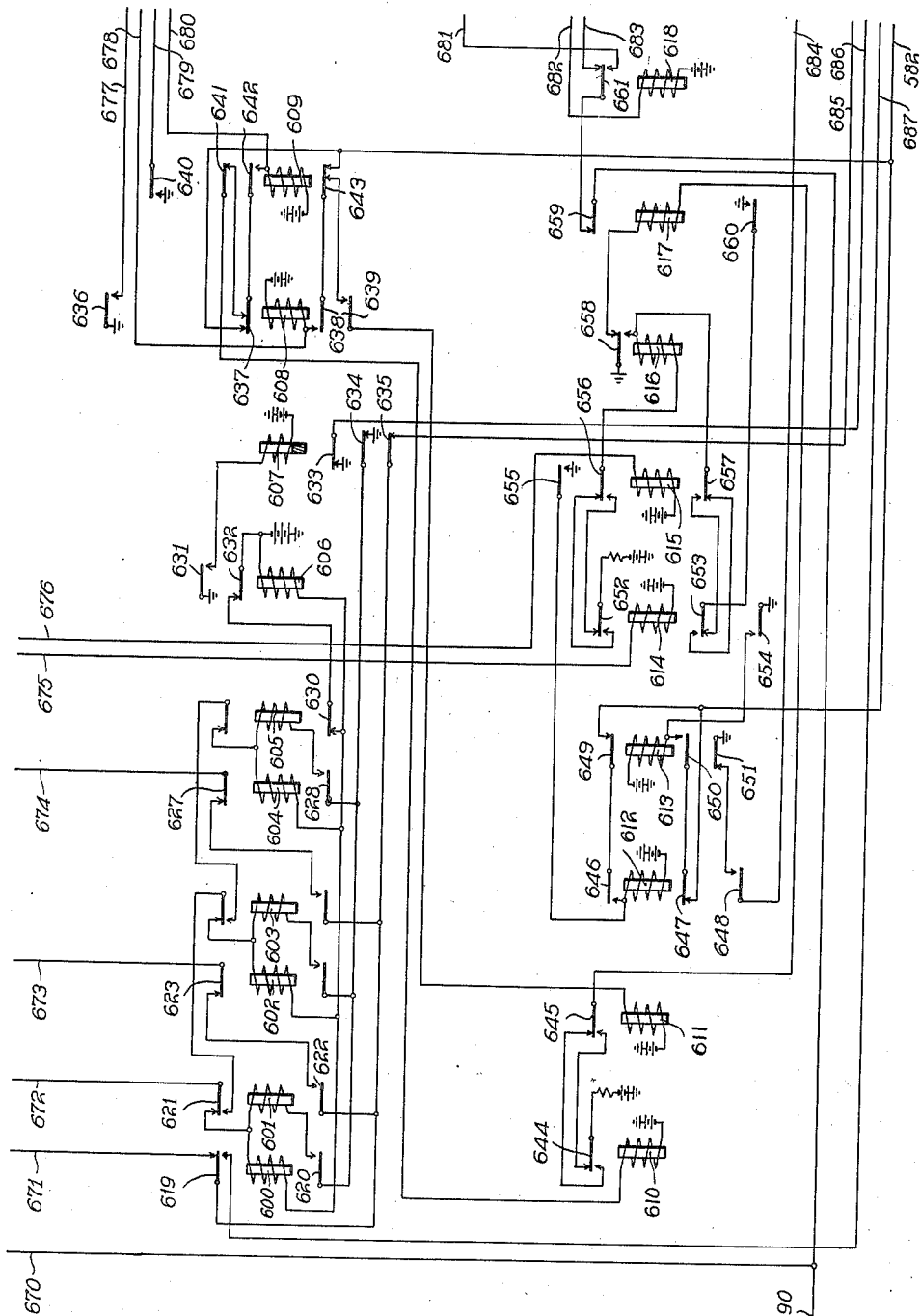

Relays 600 to 618, inclusive, of Fig. 6, and relays 800 to 808, inclusive, Fig. 8, and relays 814 to 826, inclusive, constitute the control circuit at the substation. Relays 809 to 811, inclusive, and relay 895 are provided for controlling the operation of each circuit breaker, such as C. The circuit breaker C may be of any ordinary type and may function in any desired manner. Generators G—5, G—6 and G—7 are of the ordinary type and are provided for the purpose of supplying alternating current of predetermined frequencies, namely, 500, 1300 and 1100 cycles, respectively. At 861, 836 and 838 are represented wave filters, the function of which is to exclude all frequencies of alternating current except the predetermined one.

In Fig. 7, relays 700 to 723, inclusive, comprise the relays of the counting chain at the substation. Relays 724 and 725 are controlling relays. The dispatcher's office is connected to the substation by means of a trunk line comprising conductor 490.

The apparatus shown in the drawings having been described in general, its detailed circuit operation will now be explained. For this purpose, it will be assumed that the dispatcher desires to close the circuit breaker C at the station. To accomplish this result, the dispatcher will operate the key K in the proper direction, it being assumed that this operation causes the spring 227 to be operated out of engagement with its resting contact and the spring 226 to be forced into engagement with its working contact. The dispatcher will then operate the key K—1 twice.

Normally, the alternating-current relays 222 and 815 are energized over a circuit which extends from the ungrounded brush of the 1500 cycle generator G—4, back contact and armature 270, alternating-current relay 222, wave filter 288, conductor 476, back contact and armature 444, back contact and armature 445, trunk conductor 490, armature 659 and its back contact, armature 661 and its back contact, conductor 683, wave filter 861, alternating-current relay 815, and armature 880 and its back contact to ground.

The alternating-current relay 222 operates its armatures 289 and 290. As shown on the drawing, the armature 290 of the alternating-current relay 222 forces the armature 287 of the relay 221 into engagement with its working contact. By this operation, a circuit is completed extending from ground by way of armature 289 and its front contact, armature 287 and its front contact and relay 221 to battery. The relay 221 is operated to open the original energizing circuit of the relay 216 at armature 285, to complete a circuit for the relay 212 at the front contact of this armature, and to prepare a circuit for the relay 220 at armature 286. The relay 212, upon being energized, operates its armature 265 to open the locking circuit of the relay 211 which is deenergized. The relay 211 retracts its armature 263 to prepare a point in the circuit of the relay 214 and retracts its armature 264 to complete a circuit extending from ground by way of said armature and its back contact, armature 286 and its front contact and relay 220 to battery. The relay 220 is operated to prepare a circuit for the relay 213.

At the substation, the alternating-current relay 815 is operated to cause its armature 880 to force the armature 864 of the relay 814 into engagement with its working contact. As a result of this operation, a circuit is completed extending from ground by way of armature 865 and its front contact, armature 864 and its front contact and relay 814 to battery.

The relay 814 is operated to prepare a circuit for the relay 816 at armature 863, to open the original energizing circuit of the relay 820 at armature 862 and to complete a circuit for the relay 824 at the front contact of this armature. The relay 826 is deenergized by relay 824 to prepare a point in the circuit of the relay 822 at armature 888 and to complete a circuit, at armature 889, extending from ground by way of back contact and said armature, armature 863 and its front contact and relay 816 to battery. The relay 816 is operated to prepare a circuit for the relay 823. The above relays are energized in the normal condition of the system.

The alternating-current relays 222 and 815 are mechanically connected to the armatures of the relays 221 and 814, respectively, in order that any tendency of the armatures 290 and 880 to vibrate will not bring about the intermittent operation of the relays 221 and 814, thus allowing these relays some margin of operation. When 290 is pulled up, a locking circuit is completed for relay 221 over armature 287. This locking circuit holds the members up thereafter in spite of the tendency to vibrate.

When the key K—1 is operated by the dispatcher, as before described, a circuit is completed extending from ground by way of spring 230 and its working contact, armature 269 and its back contact and relay 213 to battery. The relay 213 is operated to complete a circuit for the relay 215 at armature 267, to prepare a point in the circuit of the relay 219 at armature 268 and to complete a circuit extending from ground by way of back contact and armature 263, armature 266 and its front contact and relays 214 and 213 to battery. The relay 214 is not energized over this circuit so long as the original energizing circuit of the relay 213 is maintained closed.

When the key K—1 is released, the original energizing circuit of the relay 213 is opened. The short-circuit is thus removed from the relay 214 and this relay is energized. Upon operating, the relay 214 opens another point in the original energizing circuit of the relay 213 at armature 269 and at armature 270 opens one point in the circuit of the alternating-current relays 222 and 815.

The relay 222 is immediately deenergized to permit the relay 221 to retract its armatures. Upon being deenergized, the relay 221 opens the circuit of the relay 220 at armature 286, at the back contact of this armature completes a circuit for the relay 410, opens the circuit of the relay 212 at armature 285 and at the back contact of this armature completes a circuit for the relay 216. The relay 216 immediately operates to establish a locking circuit for itself at armature 274, to open one point in the circuit of the relay 219 at armature 275, and to complete a circuit extending from ground by way of front contact and armature 276, conductor 478, back contact and armature 429, armature 442 and its back contact, conductor 488 and switching relay 310 to battery. The relay 410 operates to complete one point in the control circuit. The relay 310 operates to connect the selecting relays 300 to 309, inclusive, so that they may be controlled by the counting relays 101 to 124, inclusive.

The relay 815 at the substation, upon being deenergized, opens the circuit of the relay 814, thereby permitting this relay to retract its armatures. Upon being deenergized, the relay 814 at armature 863 opens the circuit of the relay 816, completes a circuit for the relay 618 at the back contact of this armature, opens the circuit of the relay 824 at armature 862 and at the back contact of this armature completes a circuit for the relay 820.

The relay 816 is deenergized to open one point in the circuit of the relay 823 at armature 866 and to open one point in the circuit of the relay 817 at armature 867. The relay 618, upon being energized, opens another point in the circuit of the relay 815 at armature 661, and at the front contact of this armature prepares one point in the control circuit. The relay 824, upon being deenergized, prepares one point in the locking circuit of the relay 826 at armature 885. The relay 820, upon operating, establishes a locking circuit for itself over a path extending from ground by way of back contact and armature 633, conductor 686, armature 875 and its front contact and relay 820 to battery, prepares a point in the circuit of the relay 818 at armature 874, opens another point in the circuit of the relay 817 at armature 876, and at armature 877 completes a circuit extending from ground by way of front contact and said armature, conductor 685, back contact and armature 635, armature 619 and its back contact, conductor 671, and switching relay 518 to battery. The switching relay 518 is energized over the above circuit and operates to connect the selecting relays 500 to 509, inclusive, of the first group under the control of the counting relays 700 to 723, inclusive.

The control circuit is now completed over a path which extends from the ungrounded brush of the alternating-current generator G—3 that creates an alternating current of 300 cycles, back contact and armature 244, alternating-current relay 205, wave filter 250, back contact and armature 251, conductor 474, front contact and armature 444, back contact and armature 445, trunk conductor 490, armature 659 and its back contact, armature 661 and its front contact, conductor 681, armature 837 and its back contact, wave filter 836 that is resonant to an alternating current of a frequency of 300 cycles, alternating-current line relay 803, armature 829 and its back contact to ground. The alternating-current relays 205 and 803 are energized over the above circuit.

The alternating-current line relay 205 at the dispatcher's office, upon being energized, attracts its armature 243 to cause the operation of the armature 249 of the relay 204. As a result of the operation of the armature 249, a circuit is completed extending from ground by way of armature 250 and its front contact, armature 249 and its front contact and relay 204 to battery. The relay 204 operates to complete a circuit for the relay 203 at armature 248, and to complete a circuit extending from ground by way of front contact and armature 247, conductor 471 and relay 401 to battery. The relay 203, upon being energized, opens one point in the locking circuits of the relays 209 and 210 at armature 246, and completes a circuit extending from ground by way of armature 179 and its back contact, conductor 11, armature 257 and its back contact, armature 245 and its front contact, relay 202 and relay 203 to battery. The relay 202 is not operated over this circuit until the original energizing circuit for the relay 203 is opened.

The relay 401, upon operating, establishes a locking circuit for itself at armature 425 over a path extending from ground by way of grounded conductor 11, back contact and armature 422, armature 425 and its front contact and relay 401 to battery, at armature 424 opens another point in the locking circuit of the relay 400, and at armature 426 completes a circuit extending from ground by way of the grounded conductor 11, back contact and armature 422, front contact and armature 426 and relay 417 to battery.

Another result of the operation of the relay 401 is that, at armature 423, a circuit is completed extending from ground by way of said armature and its front contact, conductor 470, armature 241 and its back contact, conductor 16, armature 150 and its back contact, relay 112, back contact and armature 153, and back contact and armature 180 to battery.

The relay 112 is energized over the above circuit and operates to complete a circuit extending from ground by way of armature 178 and its back contact, armature 152 and its front contact, winding of relay 111, winding of relay 112, back contact and armature 153 and back contact and armature 180 to battery. The relay 111 is not operated by reason of the fact that it is short-circuited so long as the original energizing circuit of the relay 112 is completed.

The relay 417, upon being energized over the previously traced circuit, operates to complete a circuit extending from battery by way of armature 460 and its front contact, back contact and armature 461, relay 411 and back contact and armature 447 to ground. The relay 411, upon being energized, prepares one point in the circuit of the relay 412 at armature 446, and at armature 445 opens one point in the circuits of the alternating-current line relays 205 and 803 at the dispatcher's office and substation, respectively.

The relay 205, upon being deenergized, permits the relay 204 to become deenergized. As a result of the deenergization of the relay 204, the original energizing circuit of the relay 401 is opened at armature 247 and the original energizing circuit of the relay 203 is opened at armature 248. As a result of the opening of the original energizing circuit of the relay 203, the short-circuit is removed from the relay 202 and this relay is permitted to energize.

Upon operating, the relay 202 opens another point in the circuits of the relays 205 and 803 at the armature 244, opens another point in the original energizing circuit of the relay 203 at armature 242, and at armature 241 opens a point in the original energizing circuit of the counting relay 112. By the latter operation, the short-circuit is removed from the relay 111 and this relay is permitted to attract its armatures.

The relay 111, upon being operated, prepares one point in the circuit of the relay 124 at armature 149, opens another point in the original energizing circuit of the relay 112 at armature 150, and at armature 151 completes a circuit extending from ground by way of armature 178 and its back contact, armature 176 and its back contact, armature 151 and its front contact, conductor 31, spring 344 of switching relay 310 and its working contact and selecting relay 309 to battery. The selecting relay 309 is operated to prepare certain signalling circuits at springs 332, 333 and 334 and to prepare a circuit for the relay 413 at spring 330.

The relay 803, upon being energized, operates its armature 828' to bring about the engagement of the armature 834 of the relay 802 with its front contact. The relay 802 is immediately energized over a circuit extending from ground by way of armature 835 and its front contact, armature 834 and its front contact and relay 802 to battery. The relay 802 operates its armature, thereby closing a circuit for the relay 801 at armature 833, and completing a circuit extending from ground by way of armature 832 and its front contact, conductor 680 and relay 609 to battery.

The relay 801 is energized and operates to open one point in the circuits of the relays 807 and 808 at armature 831, and at armature 330 completes a circuit extending from ground by way of armature 778 and its back contact, conductor 582, back contact and armature 844, armature 830 and its front contact, relay 800 and relay 801 to battery. The above circuit is not effective until the original energizing circuit of the relay 801 is opened.

The relay 609, upon being operated, opens one point in the locking circuit of the relay 608 at armature 643, establishes a locking circuit for itself at armature 642 and at armature 641 completes a circuit extending from ground by way of armature 778 and its back contact, conductor 582, back contact and armature 637, front contact and armature 641 and relay 610 to battery. Another result of the operation of the relay 609 is that a circuit is completed extending from ground by way of front contact and armature 640, conductor, 679, armature 828 and its back contact, conductor 580, armature 728 and its back contact, relay 700, back contact and armature 771 and back contact and armature 774 to battery.

The relay 700, upon operating, completes a circuit, at armature 726, extending from ground by way of armature 777 and its back contact, armature 726 and its front contact, relay 701, relay 700, back contact and armature 771 and back contact and armature 774 to battery. The relay 701 is not energized over the above circuit by reason of the fact that it is short-circuited as long as the original energizing circuit for the relay 700 is completed.

The relay 610 is energized over a previously traced circuit and operates to complete a circuit extending from battery by way of armature 644 and its front contact, back contact and armature 645, relay 617 and back contact and armature 658 to ground. The relay 617, upon being energized, opens the original energizing circuit of the alternating-current line relay 803, thus permitting this relay to be deenergized. The relay 803, upon retracting its armature, permits the relay 802 to deenergize. The relay 802, upon retracting its armatures, opens the original energizing circuit of the relay 609 at armature 832, and at armature 833 opens the original energizing circuit of the relay 801. The latter operation permits the relay 800 to energize. The relay 800, upon operating, opens another point in the original energizing circuit of the relay 803 at armature 829, and at armature 828 removes the short-circuit from the winding of the relay 701.

The relay 701, upon being energized, prepares a circuit for the relay 712 at armature 727, opens another point in the original energizing circuit of the relay 700 at armature 728, and at armature 729 completes a circuit extending from ground by way of armature 777 and its back contact, armature 750 and its back contact, armature 729 and its front contact, conductor 575, spring 546 and its working contact and selecting relay 500 to battery. The selecting relay 500 is operated to complete certain signalling circuits at springs 521, 522 and 523, and to prepare a circuit for the relay 615 at spring 524.

The selecting relays 309 and 500 at the dispatcher's office and substation, respectively, are now energized and a signalling circuit is completed extending from the ungrounded brush of the 900 cycle generator G—1 by way of spring 228 of key K—1 and its working contact, spring 226 of key K and its working contact, conductor 12, spring 334 and its working contact, wave filter 395 that is resonant to alternating currents of frequencies of 700 and 900 cycles, conductor 489, trunk conductor 490, conductor 670, wave filter 531 that is resonant to alternating current of a frequency of 900 cycles, and alternating-current relay 511 to ground. The alternating-current relay 511 is energized over the above circuit and attracts its armature 536 to cause the armature 534 in the relay 510 to be forced into engagement with its working contact. As a result of this operation, a circuit is completed extending from ground by way of armature 535 and its front contact, armature 534 and its front contact and relay 510 to battery. The relay 510 is operated over this circuit and attracts its armature 533 to complete a circuit extending from battery by way of said armature and its front contact, spring 522 and its working contact, conductor 561 and relay 810 to ground.

The relay 810 operates to open the locking circuit of the relay 809 at armature 853, to prepare a locking circuit for itself at armature 854, to prepare a point in the control circuit at armature 855 and to complete a circuit at armature 856 for the closing coil 812 of the circuit breaker C. The closing coil 812 is energized in series with the low-resistance relay 825 and operates to close the circuit breaker. The closure of the circuit breaker may bring about any desired result at the station.

The relay 809, upon being deenergized, opens one point in the circuit of the tripping relay 813 at armature 852, establishes a locking circuit for the relay 810 at armature 851 and at armature 849 removes ground from the conductor 563.

One of the results of the closure of the circuit breaker C is that the circuit of the relay 825 is opened. The relay 825, upon operating, completes a circuit extending from ground by way of front contact and armature 886, armature 874 and its front contact, armature 871 and its back contact and relay 818 to battery. The relay 818 is energized to prepare one point in the circuit of the relay 817 and to complete a circuit extending from ground by way of back contact and armature 868, armature 869 and its front contact, relay 819 and relay 818 to battery. The relay 819 is not energized over this circuit by reason of the fact that it is short-circuited so long as the original energizing circuit of the relay 818 is completed.

When the relay 825 is deenergized, as described before, the short-circuit is removed from the relay 819 and this relay is energized in series with the relay 818. The relay 819, upon being energized, prepares a circuit for the relay 823 at armature 873 and prepares another point in the circuit of the relay 817 at armature 872.

Another result of the closure of the circuit breaker C is that the relay 811 is energized. As a result of this operation, ground from armature 854 is placed upon the conductor 563, and the ungrounded pole of the generator G—6, that creates an alternating current of a frequency of 1300 cycles, is connected to conductor 560. The grounding of conductor 563 completes a circuit which extends from said grounded conductor, working contact of spring 524 and said spring, conductor 676, and relay 615 to battery. The relay 615, upon operating, completes a circuit for the relay 612 at armature 655 and, at armatures 656 and 657, completes a circuit which extends from ground by way of front contact and armature 660, armature 653 and its back contact, front contact and armature 657, relay 616, armature 656 and its front contact and back contact and armature 652 to battery.

The relay 616 is energized over the above circuit and, upon operating, establishes a locking circuit for itself at armature 658, and at the back contact of this armature opens the circuit of the relay 617. The relay 617 is deenergized to open the original energizing circuit of the relay 616 at armature 660 and to prepare one point in the control circuit at armature 659.

The relay 612, upon operating, opens one point in the locking circuit of the relay 613 at armature 647, establishes a locking circuit for itself at armature 646, and completes a circuit at armature 648 extending from ground by way of armature 651 and its back contact, front contact and armature 648, conductor 684 and relay 804 to battery. The relay 804 operates to disconnect the alternating-current relay 803 from the control circuit and connects the alternating-current line relay 806 thereto.

It will be remembered that, when the relay 811 is operated by the operation of the circuit breaker C, the ungrounded brush of the generator G—6 is connected to the conductor 560. As a result of this operation, a circuit is completed extending from said ungrounded brush, front contact and armature 857, alternating-current relay 895, conductor 560, working contact of spring 521 and said spring, wave filter 595 that is resonant to alternating current of frequencies of 1100 and 1300 cycles, conductor 670, trunk conductor 490, conductor 489, wave filter 361 that is resonant to an alternating current of a frequency of 1300 cycles and alternating-current relay 318 to ground.

The relay 318 operates its armature 360 to cause the armature 358 of the relay 316 to engage its working contact. As a result of this operation, the relay 316 is energized over a circuit extending from ground by way of armature 359 and its front contact, armature 358 and its front contact and relay 316 to battery. The relay 316 immediately operates to complete a circuit at armature 357 which extends from ground by way of front contact and said armature, spring 333 and its working contact, conductor 14 and relay 201 to battery.

The relay 201 is immediately energized to open the locking circuit of the relay 200 at armature 240, to prepare a locking circuit for itself at armature 239, to place ground upon the conductor 13 at armature 238, and to complete a circuit for the signalling lamp 232 at armature 237. The relay 200 is deenergized to complete a locking circuit for the relay 201 at armature 235, and to extinguish the signalling lamp 231 at armature 233. The change in supervisory signals notifies the dispatcher that the circuit breaker at the substation has been operated.

By the grounding of conductor 13, a circuit is completed which extends by way of said conductor, working contact of spring 330 and said spring, conductor 483, and relay 413 to battery. The relay 413 is energized to complete a circuit for the relay 416 at armature 448 and to complete a circuit for the relay 412 at armatures 449 and 450 over a path which extends from ground by way of front contact and armature 446, armature 452 and its back contact, front contact and armature 450, relay 412, armature 449 and its front contact and back contact and armature 451 to battery.

The relay 416, upon operating, establishes a locking circuit for itself at armature 457, opens one point in the locking circuit of the relay 415 at armature 458 and at armature 459 completes a circuit which extends from ground by way of armature 456 and its back contact, front contact and armature 459, conductor 477 and relay 206 to battery. The relay 206 operates to disconnect the alternating-current line relay 205 from the control circuit and connects the alternating-current line relay 208 thereto.

Upon operating, the relay 412 opens the circuit of the relay 411 at armature 447 and at the front contact of this armature establishes a locking circuit for itself. The relay 411, upon being deenergized, restores one point in the control circuit at armature 445 and at armature 446 opens the original energizing circuit of the relay 412.

The control circuit is now completed and extends from ground by way of back contact and armature 261, alternating-current line relay 208, wave filter 252 that is resonant to an alternating current of a frequency of 500 cycles, front contact and armature 251, conductor 474, front contact and armature 444, back contact and armature 445, trunk conductor 490, armature 659 and its back contact, armature 661 and its front contact, conductor 681, armature 837 and its front contact, wave filter 838 that is resonant to an alternating current of a frequency of 500 cycles, alternating-current line relay 806, and armature 848 and its back contact to the ungrounded brush of the generator G—5 that creates an alternating current of 500 cycles. The line relays 806 and 208 are energized over this circuit.

The line relay 208, at the dispatcher's office, upon being operated, attracts its armature 260 to force the armature 255 of the relay 207 into engagement with its working contact. As a result of this operation, a circuit is completed for the relay 207 extending from ground by way of armature 256 and its front contact, armature 255 and its front contact and relay 207 to battery.

The relay 207 is energized to complete a circuit for the relay 209 at armature 254 and to complete a circuit at armature 253 extending from ground by way of said armature and its front contact, conductor 473 and relay 400 to battery. The relay 209, upon being energized, opens the locking circuit of the relays 202 and 203 at armature 257 and prepares a circuit for the relay 210 at armature 256'. The relay 202 is deenergized to prepare a circuit for the relay 203 at armature 242 and to prepare a circuit for the relay 205 at armature 244. The relay 203 is deenergized to complete a circuit extending from ground by way of armature 179 and its back contact, conductor 11, back contact and armature 246, armature 256 and its front contact, relay 210 and relay 209 to battery. The circuit traced above is not effective until the original energizing circuit for the relay 209 is opened.

The relay 400, upon being energized, opens the locking circuit of the relay 401 at armature 422, opens the circuit of the relay 417 at this same armature, prepares a locking circuit for itself at armature 421 and at armature 420 prepares a circuit for the relay 418. The relay 401, upon being deenergized, establishes a locking circuit for the relay 400 to grounded conductor 11 and also completes a circuit for the relay 418 at armature 424. The relay 417, upon being deenergized, opens one point in the circuit of the relay 411 at armature 460 and prepares another circuit for this relay at the back contact of this same armature. The relay 418, upon being energized, prepares a circuit for the relay 411.

Another result of the operation of the relay 400 is that, at armature 419, a circuit is completed extending from ground by way of said armature and its front contact, conductor 472, armature 258 and its back contact, conductor 17, front contact and armature 149, armature 174 and its back contact, relay 124, back contact and armature 153 and back contact and armature 180 to battery. The relay 124, upon being operated, opens the circuit of the selecting relay 309 at armature 176 and, at the front contact of this armature, completes a circuit for the relay 123. The latter circuit is not effective until the original energizing circuit of the relay 124 is opened.

The relay 309, upon being deenergized, opens certain signalling circuits at the springs 332, 333 and 334, and at the spring 330 removes ground from the conductor 483, thereby opening the circuit of the relay 413. The relay 413, upon being deenergized, opens one point in the original energizing circuit of the relay 416 at armature 448, and at armature 449 opens the locking circuit of the relay 412. The relay 412 is deenergized to complete a circuit extending from ground by way of armature 447 and its back contact, winding of relay 411, armature 461 and its front contact and back contact and armature 460 to battery.

Upon operating, the relay 411 prepares a circuit for the relay 412 at armature 446 and at armature 445 opens one point in the trunk or control circuit. As a result of the opening of the control circuit, the alternating-current line relay 208 is deenergized to open the circuit of the relay 207. The relay 207 is deenergized to open one point in the original energizing circuit of the relay 400 at armature 253 and to open one point in the original energizing circuit of the relay 209 at armature 254. As a result of the latter operation, the short-circuit is removed from the relay 210 and this relay is operated. Upon operating, the relay 210 opens another point in the original energizing circuit of the relay 209 at armature 259, opens another point in the circuit of the relay 208 at armature 261, and at armature 258 removes the short-circuit from the winding of the relay 123. The relay 123 is now energized.

Upon operating, the relay 123 prepares a point in the circuit of the relay 110 at armature 173, opens another point in the original energizing circuit of the relay 124 at armature 174 and at armature 175 completes a circuit which extends from ground by way of armature 178 and its back contact, armature 148 and its back contact, armature 175 and its front contact, conductor 30, spring 343 and its working contact and selecting relay 308 to battery. The relay 308 is energized over the above circuit and operates to prepare certain signalling circuits in the same manner as the operation of the relay 309.

Inasmuch as the key associated with the particular apparatus unit that is selected by the operation of the relay 308 has not been operated by the dispatcher, there will be no signalling circuit completed from the dispatcher's office. Inasmuch as the particular apparatus unit at the substation that is adapted to be selected by the operation of the selecting relay 308 is not operated, there will be no signalling circuit completed from the substation.

By reason of the fact that the key associated with this particular apparatus unit is not operated, the conductor 19 will be grounded through relays, such as 200 associated with lines 13 over key K and 201, that are associated with the particular key to which the conductor 19 extends. The ground on the conductor 19 extends by way of the working contact of spring 328 and said spring, conductor 484 and relay 414 to battery.

The relay 414 is operated to complete a circuit for the relay 415 at armature 453 and to complete a circuit for the relay 412 at armatures 451 and 452. The circuit for the relay 412 extends from ground by way of front contact and armature 446, armature 452 and its front contact, back contact and armature 450, relay 412, armature 449 and its back contact and front contact and armature 451 to battery. The relay 415, upon being energized, opens the locking circuit of the relay 416 at armature 454, prepares a locking circuit for itself at armature 455, and at armature 456 opens the circuit of the relay 206. The relay 416 is deenergized to establish the locking circuit of the relay 415.

The relay 206 is deenergized to disconnect the alternating-current line relay 208 from the control circuit and connect the alternating-current line relay 205 thereto.

The relay 412, upon being energized, opens the circuit of the relay 411 at armature 447 and at the front contact of this armature establishes a locking circuit for itself. The relay 411, upon being deenergized, opens the original energizing circuit of the relay 412 at armature 446 and at armature 445 prepares another point in the control circuit.

At the substation, the relay 806, upon being energized, at armature 847, forces the armature 841 of the relay 805 into engagement with its working contact. As a result of this operation, a circuit is completed extending from ground by way of armature 842 and its front contact, armature 841 and its front contact and relay 805 to battery. The relay 805 is energized to complete a circuit for the relay 807 at armature 840 and to complete a circuit extending from ground by way of front contact and armature 839, conductor 678 and relay 608 to battery.

The relay 807, upon being energized, opens the locking circuits of the relays 800 and 801 at armature 844, and at armature 843 prepares a circuit for the relay 808. The relay 800, upon retracting its armature, prepares a circuit for the relay 801 at armature 827, and at armature 829 prepares a circuit for the line relay 803. The relay 801, upon being deenergized, completes a circuit which extends from the grounded conductor 582, back contact and armature 831, armature 843 and its front contact, relay 808 and relay 807 to battery. This circuit is not effective so long as the original energizing circuit of the relay 807 is completed.

The relay 608, upon being energized, prepares a locking circuit for itself at armature 638, prepares a circuit for the relay 611 at armature 639, opens the locking circuit of the relay 609 at armature 637 and also opens the circuit of the relay 610 at this same armature. The relay 609, upon being deenergized, establishes a locking circuit for the relay 608 at armature 643 and completes a circuit for the relay 611 at this same armature. The relay 610, upon being deenergized, opens one point in the circuit of the relay 617 at armature 644 and at the back contact of this armature prepares another circuit for the said relay. The relay 611, upon being energized, prepares another point in the circuit of the relay 617.

Another result of the operation of the relay 608 is that a circuit is completed extending from ground by way of armature 636 and its front contact, conductor 677, armature 845 and its back contact, conductor 581, front contact and armature 727, armature 752 and its back contact, relay 712, back contact and armature 771 and back contact and armature 774 to battery. The relay 712 is energized over the above circuit and operates, at its armature 750, to open the circuit of the selecting relay 500 and, at the front contact of this armature, to complete a circuit for the relay 713. The circuit for the relay 713 is not effective until the original energizing circuit of the relay 712 is opened.

The relay 500, upon being deenergized, opens certain points in the signalling circuit and also removes ground from the conductor 676, thereby opening the circuit of the relay 615. The relay 615 is deenergized to open the original energizing circuit of the relay 612 and to open the circuit of the relay 616. The relay 616 is deenergized to complete a circuit which extends from ground by way of armature 658 and its back contact, relay 617, armature 645 and its front contact, and back contact and armature 644 to battery. The relay 617 operates to prepare a point in the circuit of the relay 616 at armature 660, and at armature 659 opens another point in the trunk or control circuit.

As a result of the opening of the control circuit, the alternating-current line relay 806 is deenergized and the circuit of the relay 805 is opened. The relay 805, upon being deenergized, opens the original energizing circuit of the relay 608 at armature 839, and at armature 840 removes the short-circuit from the winding of the relay 808. The relay 808 immediately operates to open another point in the original energizing circuit of the relay 807 at armature 846, and at armature 848 opens another point in the circuit of the relay 806.

Another result of the operation of the relay 808 is that, at armature 845, the short-circuit is removed from the winding of the relay 713 and this relay is energized. Upon operating, the relay 713 prepares a point in the circuit of the relay 702 at armature 751, opens another point in the original energizing circuit of the relay 712 at armature 752, and at armature 753 completes a circuit extending from ground by way of armature 777 and its back contact, armature 730 and its back contact, armature 753 and its front contact, conductor 574, spring 547 and its working contact and selecting relay 501 to battery.

The selecting relay 501 operates to prepare certain signalling circuits. Another result of the operation of the selecting relay is that the conductor 675 is grounded. This is true by reason of the fact that the conductor 599 extends to relays, such as 809 to 811, inclusive, associated with another circuit breaker, such as C, in the same manner that the conductor 563 extends to the relays 809 to 811, inclusive. Ground is present upon this conductor by reason of the fact that no action of the associated circuit breaker has occurred.

The grounding of the conductor 675 causes the energization of the relay 614. The relay 614, upon being operated, completes a circuit for the relay 613 at armature 654, and at armatures 652 and 653 completes a circuit for the relay 616. The relay 613, upon being energized, opens the locking circuit of the relay 612 at armature 649, prepares a point in its locking circuit at armature 650, and at armature 651 opens the circuit of the relay 804. The relay 612, upon being deenergized, establishes the locking circuit of the relay 613 at armature 647. The relay 804, upon being deenergized, disconnects the alternating-current line relay 806 from the control circuit and connects the line relay 803 thereto. The relay 616 is energized over a circuit extending from ground by way of front contact and armature 660, armature 653 and its front contact, back contact and armature 657, relay 616, armature 656 and its back contact, and front contact and armature 652 to battery.

The relay 616, upon being operated, completes a locking circuit for itself at armature 658 and at the back contact of this armature opens the circuit of the relay 617. The relay 617 is deenergized to open the original energizing circuit of the relay 616 at armature 660 and to complete the control circuit at armature 659.

The control circuit extends from the ungrounded brush of the generator G—3 which generates an alternating-current of a frequency of 300 cycles, by way of back contact and armature 244, relay 205, wave filter 250', back contact and armature 251, conductor 474, front contact and armature 444, back contact and armature 445, trunk conductor 490, armature 659 and its back contact, armature 661 and its front contact, conductor 681, armature 837 and its back contact, wave filter 836, relay 803 and armature 829 and its back contact to ground. The relays 205 and 803 are energized over this circuit.

The operation will now proceed in substantially the same manner as has been described previously. Thus, by the operation of the control circuit, the relays 110 and 109, 122 and 121, 108 and 107, 120 and 119, 106 and 105, 118 and 117, 104 and 103, 116 and 115 and 102 and 101 at the dispatcher's office are energized in the sequence mentioned. The selecting relays 307, 306, 305, 304, 303, 302, 301 and 300 are energized in substantially the same manner as before described.

The circuit of the relay 102 is completed by the energization of the line relay 205, causing the energization of the relay 204 which, in turn, brings about the operation of the relay 401. The relay 102, upon operating, opens the circuit of the selecting relay 300 at armature 132 and at the front contact of this armature completes a circuit for the relay 101 which is effective when the circuit for the relay 102 is opened by the operation of the relay 202, which is brought about by the action of the control circuit.

The relay 300, upon being deenergized, opens certain signalling circuits and also removes ground from the conductor 484. The removal of ground from the conductor 484 permits the relay 414 to be deenergized. This relay retracts its armatures 451 and 452, thereby opening the circuit of the relay 412. The relay 412 is deenergized to complete a circuit for the relay 411. The relay 411 operates to open one point in the control circuit at armature 445 and to prepare a point in the circuit of the relay 412 at armature 446.

The opening of the control circuit causes the deenergization of the line relay 205 and the consequent deenergization of the relay 204. The retraction of the armatures of the relay 204 removes the short-circuit from the winding of the relay 202 and permits this relay to be energized. The relay 202 operates to remove the short-circuit from the winding of the relay 101 and this relay is energized to prepare a circuit for the relay 114 at armature 129, to open one point in the original energizing circuit of the relay 102 at armature 130, and to complete a circuit extending from ground by way of armature 178 and its back contact, armature 156 and its back contact, armature 131 and its front contact, conductor 21, and relay 314 to battery. The relay 314 is energized over this circuit and operates to place ground upon the conductor 483 at armature 351, and at armature 352, to complete a circuit extending from ground by way of said armature and its front contact, conductor 487, armature 440 and its back contact, relay 409, back contact and armature 433, and back contact and armature 431 to battery.

The relay 409 operates to open the circuit of the switching relay 310 at armature 442, and at armature 443 completes a circuit extending from ground by way of back contact and armature 428, armature 443 and its front contact, relay 408, relay 409, back contact and armature 433 and armature 431 to battery. As a result of the deenergization of the switching relay 310, the first group of selecting relays is disconnected from the control of the counting relays.

The grounding of conductor 483 brings about the energization of the relay 413, and the operation of the relays 412 and 416. The relay 416 operates to open the circuit of the relay 415 and to prepare a circuit for the relay 206. The relay 415, upon being deenergized, brings about the energization of the relay 206 and the establishment of a locking circuit for the relay 416. The operation of the relay 412 opens the circuit of the relay 411. The relay 411 is deenergized to prepare a circuit for the line relay 208 and to open one point in the original energizing circuit of the relay 412.

At the substation, the relays 702 and 703, 714 and 715, 704 and 705, 716 and 717, 706 and 707, 718 and 719, 708 and 709, 720 and 721 and 710 and 711 are energized in the sequence mentioned by the operation of the two line relays 803 and 806 under the control of the control circuit. The selecting relays 502 to 509, inclusive, are energized in a manner similar to that described. The operation of the corresponding selecting relays at the dispatcher's office and at the substation takes place simultaneously, that is, the corresponding selecting relays at both the dispatcher's office and the substation are energized together. The signalling circuits function in identically the same manner as before described.

The relay 710 is energized by the operation of the line relay 803, bringing about the energization of the relay 802 and the relay 609. Upon operating, the relay 710 opens the circuit of the selecting relay 509 at armature 746 and at the front contact of this armature completes a circuit for the relay 711. This circuit is not effective so long as the original energizing circuit of the relay 710 is maintained.

The deenergization of the selecting relay 509 causes the removal of ground from conductor 675, thus permitting the relay 614 to be deenergized. The relay 614, upon being deenergized, causes the release of the relay 616. The deenergization of the relay 616 brings about the operation of the relay 617 which opens one point in the control circuit.

The opening of the control circuit brings about the deenergization of the relay 802. The release of the relay 802 permits the relay 800 to be energized. The energization of the relay 800 brings about the removal of the short-circuit from the winding of the relay 711 and this relay is operated. The relay 711, upon being energized, prepares a circuit for the relay 722 at armature 747, opens one point in the original energizing circuit of the relay 710 at armature 748 and at armature 749 completes a circuit extending from ground by way of armature 777 and its back contact, armature 770 and its back contact, armature 749 and its front contact, conductor 565, and relay 514 to battery.

The relay 514 is energized to place ground upon the conductor 676 at armature 541 and to complete a circuit at armature 542 which extends from ground by way of said armature and its front contact, conductor 672, armature 621 and its back contact, relay 600, back contact and armature 630 and back contact and armature 632 to battery.

The relay 600 is energized over the above circuit and operates, at armature 619, to open the circuit of the switching relay 518, to place ground upon the conductor 687 at the front contact of this armature, from 877, and to complete a circuit extending from ground by way of back contact and armature 634, armature 620 and its front contact, relay 601, relay 600, back contact and armature 630, and back contact and armature 632 to battery. This circuit is not effective so long as the original energizing circuit of the relay 600 is completed.

The grounding of conductor 676 brings about the energization of the relay 615. The relay 615, upon operating, completes a circuit for the relay 612 and also for the relay 616. The relay 612, upon being energized, opens the locking circuit of the relay 613, prepares a locking circuit for itself and establishes a circuit for the relay 804. The deenergization of the relay 613 brings about the completion of the locking circuit and also the energization of the relay 804. The relay 804 operates to connect the line relay 806 in the control circuit.

The relay 616, upon being energized, establishes a locking circuit for itself at armature 658, and at the back contact of this same armature opens the circuit of the relay 617. The relay 617 is deenergized to complete the trunk or control circuit. The line relays 208 and 806 are now energized in series.

The line relay 208 operates to cause the energization of the relay 207. The relay 207 operates to complete a circuit for the relay 209 and also for the relay 400. The relay 209 is energized to complete a circuit for the relay 210 which is effective when the original energizing circuit of the relay 209 is opened, and to open the locking circuits of the relays 202 and 203 which are deenergized. The relay 400 operates to bring about the release of the relay 401 and the consequent deenergization of the relay 417 and the energization of the relay 418.

Another result of the operation of the relay 400 is that a circuit is completed for the counting relay 114. The counting relay 114 is operated to open the circuit of the relay 314 at armature 156 and to establish a circuit for the relay 113 at the front contact of this armature. The relay 113 is not energized until the original energizing circuit of the relay 114 is opened. The relay 314, upon being deenergized, removes ground from the conductor 483 and also from the conductor 487.

The removal of ground from the conductor 487 causes the energization of the relay 408. The relay 408 operates to open another point in the original energizing circuit of the relay 409 at armature 440, to prepare a circuit for the relay 407 at the front contact of this armature, and to establish a circuit at armature 441 which extends from ground by way of front contact and armature 276, conductor 478, back contact and armature 429, armature 441 and its front contact, back contact and armature 438, conductor 486 and switching relay 311 to battery. The switching relay 311 is energized to connect the second group of selecting relays under the control of the counting relays.

As a result of the removal of ground from conductor 483, the relay 413 is deenergized and the relay 412 is released. As a result of the deenergization of the relay 412, a circuit is completed for the relay 411 and this relay is operated to open one point in the control circuit at armature 445 and to prepare a circuit for the relay 412 at armature 446.

The opening of the control circuit brings about the deenergization of the relay 208 and the release of the relay 207. The relay 207, upon being deenergized, removes the short-circuit from the relay 210 and this relay is operated to open another point in the circuit of the line relay 208 and to remove the short-circuit from the winding of the counting relay 113.

The relay 113, upon operating, opens another point in the original energizing circuit of the relay 114 at armature 154, removes the short-circuit from the relay 126, thus permitting this relay to energize in series with all the counting relays at armature 153, and at armature 155 to momentarily complete a circuit extending from ground by way of armature 177 and its back contact, armature 155 and its front contact, conductor 20 and relay 313 to battery.

The relay 313 is energized to place ground upon the conductor 484. The grounding of conductor 484 brings about the operation of the relay 414. The relay 414, upon being energized, completes a circuit for the relay 415 and also for the relay 412. The relay 415 is operated to open the locking circuit of the relay 416 and to open the circuit of the relay 206. The relay 206 is deenergized to disconnect the line relay 208 from the control circuit and to connect the line relay 205 thereto. The relay 412, upon being energized, establishes a locking circuit for itself and opens the circuit of the relay 411, which is deenergized to complete a point in the control circuit.

The relay 126, upon being operated over a previously traced circuit, brings about the energization of the slow-acting relay 125. The relay 125 is operated to open the circuit of the relay 313 at armature 177, to open the circuits of all the counting relays 101 to 124, inclusive, at armature 178, to remove ground from the conductor 11 at armature 179, and to place ground upon the conductor 10 at the front contact of this armature.

The removal of ground from the conductor 11 brings about the deenergization of the relays 209 and 210 with the result that certain circuits are prepared for the line relay 208. The removal of ground from the conductor 11 also brings about the release of the relays 400, 417 and 415. The relay 400 is deenergized to restore certain circuits to normal and the relay 417 is deenergized to open one point in the circuit of the relay 411. The relay 415 is deenergized to restore certain circuits to normal.

As a result of the grounding of conductor 10, the relay 211 is energized and operates to establish a locking circuit for itself at armature 262, to open the circuit of the relays 213 and 214 at armature 263 and to open the circuit of the relay 410 at armature 264. The relay 410 is deenergized to prepare a circuit for the relay 222. The relay 213 is deenergized to open the circuit of the relay 215. The relay 214 is deenergized to prepare a circuit for the relay 213 and to prepare another point in the circuit of the relay 222. The relay 215 is deenergized to complete a circuit which will be described hereinafter.

The operation of the line relay 806 at the sub-station causes the operation of the relay 805. The relay 805 operates to close a circuit for the relay 807 and also a circuit for the relay 608. The relay 807 prepares a circuit for the relay 808, which is effective upon the opening of the original energizing circuit of the relay 807, and opens the locking circuits of the relays 800 and 801, which are deenergized to restore certain circuits to normal.

The operation of the relay 608 brings about the deenergization of the relay 609, the deenergization of the relay 611 and, also, the deenergization of the relay 610. The relay 609 is deenergized to restore certain circuits to normal. The relay 610 is deenergized to prepare a circuit for the relay 617 and the relay 611 is deenergized for the same purpose.

Another result of the operation of the relay 608 is that a circuit is completed for the counting relay 722. The relay 722 is energized to open the circuit of the relay 514 and to prepare a circuit for the relay 723, which is effective upon the opening of the original energizing circuit for the relay 722. The relay 514 is deenergized to remove ground from the conductors 672 and 676.

The removal of ground from the conductor 672 permits the relay 601 to be energized. The relay 601 operates to open another point in the original energizing circuit of the relay 600 and to prepare a circuit for the relay 602. Another result of the operation of the relay 601 is that a circuit is completed extending from ground by way of front contact and armature 877, conductor 685, back contact and armature 635, armature 622 and its front contact, back contact and armature 623, conductor 673 and switching relay 517 to battery. The switching relay 517 is energized to connect the second group of selecting relays under the control of the counting relays.

The removal of ground from the conductor 676 brings about the deenergization of the relay 615. The relay 615 is deenergized to open the circuit of the relay 616. The relay 616 is deenergized to complete a circuit for the relay 617. The relay 617 operates to prepare a circuit for the relay 616 and open one point in the control circuit.

As a result of the opening of the control circuit, the line relay 806 is deenergized, as is the relay 805. As a result of the deenergization of the relay 805, the relay 808 is permitted to energize. The relay 808 operates to open another point in the circuit of the relay 806 and to remove the short-circuit from the relay 723. The relay 723 is operated to remove the short-circuit from the relay 724 at armature 771, thereby permitting this relay to energize in series with the counting relays, to open another point in the circuit of the relay 722 at armature 772, and to complete a circuit extending from ground by way of armature 776 and its back contact, armature 773 and its front contact, conductor 564 and relay 515 to battery.

The relay 515 is energized to place ground upon the conductor 675 at armature 543. The grounding of conductor 675 brings about the energization of the relay 614. The relay 614 operates to complete a circuit for the relay 613, and to complete a circuit for the relay 616. The relay 613 operates to open the locking circuit of the relay 612, thus permitting this relay to deenergize, and to open the circuit of the relay 804. The retraction of the armature 837 of the relay 804 disconnects the line relay 806 from the control circuit and connects the line relay 803 thereto.

The relay 616 is operated to establish a locking circuit for itself and to open the circuit of the relay 617. The relay 617 is deenergized to complete the control circuit.

The relay 724 is energized in series with the counting relays and brings about the operation of the relay 725. The relay 725 operates to open the circuit of the relay 515 at armature 776, to open the circuit of all the counting relays 700 to 723, inclusive, at armature 777, to remove ground from the conductor 582 and to place ground upon the conductor 583 at armature 728. The relay 515 is deenergized to bring about the deenergization of the relay 614 which permits the relay 616 to be deenergized. The release of the counting relays restores certain circuits to their normal condition.

The removal of ground from conductor 582 brings about the deenergization of the relays 807, 808, 609, 613 and 610. These relays are deenergized to restore certain circuits to normal. The grounding of conductor 583 brings about the energization of the relay 826.

The relay 826 is operated to establish a locking circuit for itself at armature 887, to open the circuit of the relays 822 and 823 at armature 888, and to open the circuit of the relay 816 at armature 889. The relay 816 is deenergized to prepare a point in the circuit of the relay 815. The relay 823 is deenergized to open the circuit of the relay 821, while the relay 822 is deenergized to prepare another point in the circuit of the relay 815. The relay 821 is deenergized to prepare a circuit for the relay 823.

A circuit is now established which extends from the ungrounded brush of the generator G—4 that generates alternating current of a frequency of 1500 cycles, back contact and armature 270, holding relay 222, wave filter 288, conductor 476, back contact and armature 444, back contact and armature 445, trunk conductor 490, armature 659 and its back contact, armature 661 and its back contact, conductor 683, wave filter 861, holding relay 815 and back contact and armature 880 to ground. The relays 222 and 815 are energized over the above circuit.

The relay 222, upon being energized, completes a circuit for the relay 221. The relay 221 operates to prepare a circuit for the relay 220 at armature 286 and to complete a circuit for the relay 212 at armature 285. The relay 212 is energized to open the locking circuit of the relay 211, which is deenergized. As a result of the deenergization of the relay 211, a circuit is completed extending from ground by way of armature 264 and its back contact, armature 286 and its front contact and relay 220 to battery.

The relay 220 is energized to prepare a point in the circuit of the relay 219 at armature 284, and to complete a circuit extending from ground by way of front contact and armature 276, conductor 478, back contact and armature 429, armature 442 and its front contact, conductor 480, back contact and armature 272, front contact and armature 283, armature 269 and its back contact, and relay 213 to battery. The relay 213 is energized to complete a circuit for the relay 214, which is effective when the original energizing circuit for the relay 213 is opened.

Another result of the operation of the relay 213 is that another point in the circuit of the relay 219 is completed at armature 268. The relay 215 is energized as another result of the operation of the relay 213. The relay 215 operates to open the previously traced circuit for the relay 213. The relay 214 is now energized in series with the relay 213. The relay 214 operates to open a point in the circuit of the relays 222 and 815.

At the substation, when the relay 815 is energized, the relay 814 is operated. The relay 814 operates to complete a circuit for the relay 824 and to prepare a circuit for the relay 816. The relay 824 operates to open the locking circuit for the relay 826, and this relay is deenergized to complete a circuit extending from ground by way of back contact and armature 889, armature 863 and its front contact and relay 816 to battery. The relay 816 is energized to complete a circuit extending from ground by way of front contact and armature 877, conductor 685, back contact and armature 635, armature 619 and its front contact, conductor 687, back contact and armature 878, front contact and armature 866, armature 879 and its back contact, and relay 823 to battery.

The relay 823 is operated to prepare a circuit for the relay 822 and to complete a circuit for the relay 821. The relay 821 operates to remove the short-circuit from the relay 822, thereby permitting this relay to energize in series with the relay 823. The relay 822 operates to open one point in the circut of the relays 222 and 815.

The control circuit now starts to function in the same manner as before to energize the counting relays 101 to 124, inclusive, at the dispatcher's office, in the proper sequence and the relays 700 to 723, inclusive, at the substation, in the same sequence. By the operation of these counting relays, inasmuch as the switching relays 311 and 517 at the dispatcher's office and substation, respectively, are now energized, the second group of selecting relays (not shown) are associated with the respective groups of counting relays. The selecting relays will now be energized in the proper sequence under the control of the counting relays in substantially the same manner as before described.

In the event that no circuit breaker operation has taken place at the substation and that the dispatcher has not thrown a control key to operate a circuit breaker or apparatus unit in this particular group, the circuit will operate at high speed and no signalling will occur. In the event that there is an operation performed by either the apparatus unit or the dispatcher, the signalling will take place in a manner similar to that already described.

When the last counting relay is energized at both the substation and dispatcher's office, the relay 314 will be released and the relay 313 will be energized, while, at the substation, the relay 514 will be released and the relay 515 will be energized. When the relay 314 is energized by the operation of the counting relay 102, the conductor 487 is grounded and a circuit is completed for the relay 407. The relay 407 operates to prepare a circuit for the relay 406, which is effective when the original energizing circuit for the relay 407 is opened, and to open the circuit of the second switching relay 311. The relay 311 is deenergized to disconnect the second group of selecting relays from the control of the counting relays.

When the relay 314 is deenergized by the energization of the counting relay 114, the short-circuit is removed from the relay 406 and this relay is permitted to energize. As a result of the operation of the relay 406, another point in the circuit of the relay 407 is opened and a circuit is prepared for the relay 405. In addition, there is a circuit completed which extends from ground by way of front contact and armature 276, conductor 478, back contact and armature 429, armature 437 and its front contact, back contact and armature 434, conductor 485 and switching relay 312 to battery. The switching relay 312 is energized to connect the third group of selecting relays (not shown) under the control of the counting relays.

When the counting relay 113 is operated, the relay 126 is energized in series with all the counting relays and the relay 313 is operated to bring about the energization of the relay 414. The relay 414 operates to cause the energization of the relay 412, thereby permitting the relay 411 to be deenergized to prepare a point in the control circuit. The relay 126 operates to complete a circuit for the relay 125, which is operated to open the circuit of the relay 313, and the circuits of all the counting relays 101 to 124, inclusive, and to bring about the release of the relays 209, 210, 400, 418 and 415. These relays are deenergized to restore certain circuits to normal.

The relay 211 is also energized to open the energizing circuit of the relay 410, thereby permitting this relay to deenergize to prepare an additional point in the control circuit. The operation of the relay 211 also opens the circuits of the relays 213 and 214 and these relays are deenergized, as is the relay 215.

At the substation, the operation of the last counting relays causes the operation of the relays 514 and 515. When the relay 514 is first operated, a circuit is completed for the relay 602 which is energized to open the circuit of the second switching relay 517 and to prepare a circuit for the relay 603. The switching relay 517 is deenergized to disconnect the second group of switching relays from the control of the counting relays.

When the relay 514 is deenergized by the operation of the counting relay 722, the short-circuit is removed from the relay 603 and this relay is permitted to energize. By the energization of the relay 603, a circuit is completed for the switching relay 516. The switching relay 516 is operated to connect the third group of selecting relays (not shown) under the control of the counting relays.

When the relay 515 is operated by the operation of the relay 723, ground is placed upon the conductor 675 and a circuit is completed for the relay 614. Another result of the operation of the relay 723 is that the relay 724 is permitted to energize. The relay 724 completes a circuit for the relay 725. The relay 725 operates to open the circuit of the relay 515, to open the circuit of all the counting relays 700 to 723, inclusive, to remove ground from conductor 582 and to place ground upon conductor 583.

The relay 614 is operated to complete a circuit for the relay 616. This relay is operated to open the circuit of the relay 617, which is deenergized to close a point in the control circuit. The deenergization of the relay 515 brings about the deenergization of the relay 614. The relay 613, of course, remains energized, having been operated upon the initial operation of the relay 614 to establish a locking circuit for itself and to open the circuit of the relay 804.

When ground is removed from conductor 582, the circuit of the relays 807, 808, 609 and 613 is opened. These relays are released to restore certain circuits to their normal condition. The grounding of conductor 583 brings about the operation of the relay 826. The operation of the relay 826 brings about the release of the relays 822 and 823 and the relay 618. The relay 618 is deenergized to prepare a circuit for the relay 815. The relays 822 and 823 retract their armatures to prepare certain circuits, among which is the circuit of the relay 815. Another result of the deenergization of the relay 823 is that the circuit of the relay 821 is opened. This relay is deenergized to prepare a circuit for the relay 823.

The relays 222 and 815 are now energized in series. The energization of the relay 222 brings about the operation of the relay 221 with the result that the relay 212 is energized to bring about the deenergization of the relay 211. The relay 211 retracts its armature 264 to complete a circuit for the relay 220. The relay 220 operates to complete the circuit of the relay 213. The relay 213 prepares a circuit for the relay 214 and completes a circuit for the relay 215. The operation of the relay 215 opens the shunt path of the relay 214, thereby permitting the relay 214 to be energized. The energization of the relay 214 opens the circuit of the relay 222.

At the substation, the relay 815 operates to cause the energization of the relay 814. The relay 814 closes the circuit of the relay 824. The relay 824 operates to open the circuit of the relay 826. The relay 826 is deenergized to complete the circuit of the relay 816. The relay 816 completes a circuit for the relay 823. The relay 823 prepares a circuit for the relay 822 and completes a circuit for the relay 821. The relay 821 removes the short-circuit from the relay 822, thereby permitting this relay to energize. The relay 822 functions to open a point in the circuit of the relay 815. The deenergization of the relays 222 and 815 now follows.

The control circuit now begins to function in the same manner as before and the counting relays 101 to 124, inclusive, at the dispatcher's office, and the counting relays 700 to 723, inclusive, at the substation, are energized in the proper sequence. Inasmuch as the third selecting relays 312 and 516 at the dispatcher's office and substation, are now energized, the selecting relays of the third groups at the dispatcher's office and substation are energized in the proper sequence to perform the required selecting operations.

In the event that there has been no apparatus unit operation at the substation and the dispatcher has not operated a key associated with the particular group selected by the third group of relays, there is no signalling circuit completed. Should the dispatcher operate a key or the apparatus unit operate, the control or signalling circuits will operate in substantially the same manner as before described.

When the counting relay 101 is energized, the relay 314 is operated to cause the energization of the relay 405. The relay 405 operates to open the circuit of the switching relay 312, thereby deenergizing this relay to disconnect the third group of selecting relays. Another result of the operation of the relay 405 is that a circuit is prepared for the relay 404. The operation of the relay 314 also brings about the energization of the relay 413. However, the operation of this relay brings about operations in substantially the same manner as before described.

When the counting relay 114 is operated, the circuit of the relay 314 is opened and this relay is deenergized to remove the short-circuit from the relay 404, thereby permitting this relay to be energized. The relay 404 operates to remove the short-circuit from the relay 403 and this relay is energized in series with the relays 404 to 409, inclusive. The relay 403 operates to complete a circuit for the relay 402.

The relay 402, upon being energized, opens the circuits of the relays 404 to 409, inclusive, at armature 428, thus permitting these relays to be deenergized. Another result of the operation of the relay 402 is that ground is removed from the conductor 479, thereby opening the locking circuit of the relay 216.

When the counting relay 113 is operated, a circuit is completed for the relay 313. The relay 313 operates to complete a circuit for the relay 414 with the same results as before. The relay 113 also brings about the operation of the relay 126. The relay 126 completes a circuit for the relay 125. The relay 125 opens the circuit of the relay 313 and also the circuits of the counting relays 101 to 124, inclusive.

The removal of ground from conductor 11 by the operation of the relay 125 brings about the release of the relays 209, 210, 400, 415 and 418. The deenergization of these relays restores certain circuits to normal. The grounding of conductor 10 by the relay 125 brings about the energization of the relay 211. This relay is operated to open the circuit of the relays 213 and 214 and to open the circuit of the relay 410. The relay 410 is deenergized to prepare a point in the circuit of the relay 222. The relays 403 to 409, inclusive, are released to restore certain circuits to normal.

At the substation, when the relay 711 is energized, the relay 514 is operated. As a result of the operation of this relay, a circuit is completed over the conductor 672 for the relay 604. The relay 604 opens the circuit of the switching relay 516 and prepares a circuit for the relay 605 at armatures 627 and 628, respectively. The relay 516 is deenergized to disconnect the third group of selecting relays from the control of the counting relays. The operation of the relay 514 also completes a circuit for the relay 615 which functions in the same manner as before.

When the relay 722 is operated, the circuit of the relay 514 is opened and this relay is deenergized to remove the short-circuit from the winding of the relay 605, thus permitting this relay to operate. As a result of the operation of the relay 605, the short-circuit is removed from the winding of the relay 606 and this relay is permitted to energize. The relay 606 operates to complete a circuit for the relay 607 at armature 631. The relay 607 opens the circuit of the relays 600 to 605, inclusive, at armature 634, and at armature 633 opens the locking circuit of the relay 820.

When the relay 723 is operated, the short-circuit is removed from the relay 724 and this relay is permitted to energize. Another result of the operation of the relay 723 is that another circuit is completed for the relay 515. The relay 515 brings about the operation of the relay 614. The relay 614 functions in the same manner as before. The relay 724 operates to complete a circuit for the relay 725. The relay 725 opens the circuit of the counting relays 700 to 723, inclusive, opens the circuit of the relay 515, removes ground from the conductor 582 and places ground upon the conductor 583.

The removal of ground from conductor 582 brings about the release of the relays 807, 808, 609, 613 and 610. The release of these relays restores certain circuits to normal. The grounding of conductor 583 brings about the operation of the relay 826. The relay 826 operates to open the circuits of the relays 822 and 823 and also the circuit of the relay 618. The relay 618 is deenergized to prepare a circuit for the relay 815.

The relays 222 and 815 are now energized in series over the trunk conductor 490 in the usual manner. The relay 222, upon being energized, completes a circuit for the relay 221. The relay 221 operates to complete a circuit for the relay 212. The relay 212 opens the circuit of the relay 211, which is deenergized. The relay 211 completes a circuit which extends from ground by way of armature 264 and its back contact, armature 286, and its front contact and relay 220 to battery. The relay 220 is energized to prepare a circuit for the relay 213. Another result of the operation of the relay 221 is that the circuit of the relay 216 is opened and this relay is deenergized. Thus, all the apparatus at the dispatcher's office is restored to normal.

At the substation, the operation of the relay 815 brings about the energization of the relay 814. The relay 814 operates to open the circuit of the relay 820 and complete a circuit for the relay 824. The relay 824 opens the circuit of the relay 826, which is deenergized. The deenergization of the relay 826 completes a circuit for the relay 816. The relay 816 operates to prepare a circuit for the relay 823.

It will be remembered that the relays 818 and 819 at the substation are locked energized by reason of the previous operation of the common relay 825, which occurred in response to the operation of the circuit breaker C. Upon the deenergization of the relay 820, previously described, there is a circuit completed which extends from ground by way of armature 873 and its front contact, armature 874 and its back contact, front contact and armature 866, armature 879 and its back contact and relay 823 to battery. The relay 823 is operated to complete a circuit for the relay 822, which is effective upon the opening of the original energizing circuit for the relay 823, and to complete a circuit which extends from ground by way of armature 872 and its front contact, armature 876 and its back contact, front contact and armature 867, front contact and armature 884, armature 870 and its front contact and relay 817 to battery.

The relay 817 is operated to open the circuits of the relays 818 and 819. The relay 819 is deenergized to open the original energizing circuit for the relay 823, thus permitting the relay 822 to operate. The relay 822 operates to open the circuit of the relays 222 and 815. The operation of the selective apparatus now occurs in substantially the same manner as before described.

The reason that the selecting equipment is reoperated after the operation of the circuit breaker is because it is desired to check the position of the particular circuit breaker and other apparatus units in order to make sure that the dispatcher's signalling devices indicate the proper condition of the associated units.

The normal operation of the system is as described above when the dispatcher desires to control a predetermined apparatus unit. In the event that an apparatus unit operates under the control of automatic devices which are responsive to circuit conditions, the dispatcher must be apprised of this operation.

In order to describe the manner in which this result is accomplished, it will be assumed that the circuit breaker C is operated by automatic devices. As a result of this operation, the relay 825 is momentarily operated and the relays 823 and 822 are operated. The operation of the relay 822 brings about the release of the relays 222 and 815 at the dispatcher's office and substation, respectively. The release of these relays initiates the operation of the selective equipment.

When the circuit breaker C is selected by the selecting apparatus, the selecting relays 309 and 500 will be energized in the same manner as before described. There will be a signalling circuit completed extending from the ungrounded brush of the 1300 cycle generator G—6, front contact and armature 811, alternating-current relay 895, conductor 560, working contact of spring 521 and said spring, wave filter 595, conductor 670, trunk conductor 490, conductor 489, wave filter 361 that is resonant to an alternating current of a frequency of 1300 cycles, and alternating-current relay 318 to ground.

The relay 318 is energized to complete a circuit for the relay 316. The relay 316 operates to complete a circuit extending from ground by way of front contact and armature 359, spring 333 and its working contact, conductor 14, and winding of relay 201 to ground. The operation of the relay 201 opens the locking circuit of the relay 200 and changes the supervisory signalling device to indicate that the circuit breaker C at the substation has operated. The relay 895 at the substation is energized in series with the relay 318. The relay 895 grounds the conductor 563, thereby bringing about the energization of the relay 615. The operation now proceeds in substantially the same manner as has been before described.

The foregoing is the manner in which the selective apparatus functions in the event that the circuit breaker C operates while the selective apparatus is normal. However, should the selective apparatus be operating at the time the circuit breaker C is automatically operated, the momentary operation of the relay 825 brings about the operation of the relays 818 and 819. As a result of the operation of the relay 819, when the selective apparatus is released in the manner described, the relay 823 is operated and the selective operations again occur in substantially the same manner as before described.

The dispatcher is also provided with means whereby he may cause the selective apparatus to function without causing any operation. This result is accomplished by the operation of the key K—2. The operation of the key K—2, in the event that the apparatus is normal, brings about the operation of the relays 213 and 214. In the event that the selective apparatus is functioning, the relays 218 and 217 are energized. Assuming that the latter relays are operated, when the selective operation is restored to normal, the relay 216 is deenergized and a circuit is completed which extends from ground by way of armature 279 and its front contact, armature 273 and its back contact, front contact and armature 283, armature 269 and its back contact and relay 213 to battery.

The relay 213 is operated to complete a circuit which extends from ground by way of armature 278 and its front contact, armature 275 and its back contact, front contact and armature 284, front contact and armature 268, armature 281 and its front contact and relay 219 to battery. The relay 219 is operated to bring about the release of the relays 217 and 218. By the release of these relays, the short-circuit is removed from the relay 214 and this relay is permitted to energize. The relay 214 operates to open the circuit of the relays 222 and 815. The opening of the circuit of these relays initiates the selective operations.

Attention is called to the fact that it is necessary for the dispatcher to maintain the key K—1 operated during the operation of the selective apparatus in order to enable control signals to be sent. It should also be noted that it is necessary for the dispatcher to restore the key K—1 to normal after each cycle of the counting chain in order to enable the apparatus to function properly.

It is also apparent that the system may be enlarged by providing more switching relays and an additional group of selecting relays for each switching relay that is provided. When the system is enlarged in this manner, it is necessary to operate the counting relays a plurality of times, depending upon the number of groups of selecting relays. Otherwise, the operation is the same as that before described.

My invention is not limited to the particular arrangement of the apparatus illustrated, but may be variously modified without departing from the spirit and scope thereof, as set forth in the appended claims.

I claim as my invention:

1. In an electrical control system, the combination with a first chain of relays and a second chain of relays remotely disposed with respect thereto, of sources of alternating current of different frequencies, means including a circuit for simultaneously operating corresponding relays in each of said chains by applying said sources of alternating current to said circuit, and means controlled by the relays in each chain for determining which source of alternating current will operate the next relay in the chain.

2. In an electrical control system, the combination with a first chain of relays and a second chain of relays remotely disposed with respect thereto, of sources of alternating current of different frequencies, means including a circuit for simultaneously operating corresponding relays in each of said chains by applying said sources of alternating current to said circuit, means controlled by the relays in each chain for determining which source of alternating current will operate the next relays in the chains, and means operative in the event that the preselected source of alternating current is not applied to said circuit for preventing the operation of the next relays in the chains.

3. In a signalling system, a first station, a second station, relay chains at each of said stations, a signalling line connecting said stations, a source of alternating current at said first station, a source of alternating current of a frequency different from that of said first-mentioned source at said second station, means for sequentially associating said sources of alternating currents with said signalling line, said means being controlled by said relay chains, and means responsive to said sequential connection of said sources of alternating currents for operating said relay chains in synchronism.

4. In a signalling system, a first station, a second station, a signalling circuit connecting said stations, apparatus units at said second station, signalling devices individual thereto at said first station, a distributor at each of said stations, sources of alternating currents of different frequencies at said first and said second stations, means for alternately applying said sources of alternating currents to said signalling circuit for operating said distributors in synchronism, said means being controlled by said distributors, other sources of alternating currents at said first station, means including said other sources of alternating currents and said signalling circuit for operating a selected apparatus unit, other sources of alternating currents at said second station, means including said sources of alternating currents at said second station for operating said signalling devices at said first station in response to the operation of said apparatus units.

5. In a supervisory control system, a first station, a second station, apparatus units at said second station, signalling devices individual thereto at said first station, a signalling line connecting said stations, distributors at each of said stations for selectively connecting said apparatus units and said individual devices to said signalling lines simultaneously, a source of alternating current at said first station, a source of alternating current of a frequency different from that of said first source at said second station, means for applying said sources of alternating current to said signalling line sequentially, said means being controlled by said distributors while in synchronism, means responsive to the sequential connection of said sources of alternating currents for operating said distributors in synchronism, means including other sources of alternating currents and said signalling line for operating selected apparatus units from said first station, and means including sources of alternating currents and said signalling line for operating said signalling devices responsive to the operation of said apparatus units.

6. In a signalling system, a first station, a second station, a source of alternating current at said first station, a source of alternating current at said second station of a different frequency from that of said source at said first station, a chain of relays at each of said stations, a signalling line connecting said stations, means controlled by said relays at each of said stations for applying one of said sources of alternating current to said signalling line, means at each station responsive to said source of alternating current for energizing corresponding relays at each station, means controlled by said relays for applying the other of said sources to said signalling line and disconnecting said first source, and means responsive to said second source of alternating current at each of said stations for operating succeeding corresponding relays in each chain.

7. In a signalling system, a first station, a second station, a chain of relays in each of said stations, a source of alternating current at said first station, a source of alternating current at said second station of a frequency different from that of said source at said first station, means controlled by said chains of relays at each of said stations when corresponding relays at each of said stations are energized simultaneously for applying said sources to said signalling line sequentially, and means responsive to the sequential application of said sources to said signalling line for sequentially operating the relays in each of said chains in synchronism.

8. In a signalling system, a first station, a second station, a chain of relays at each of said stations, a source of alternating current at said first station, a source of alternating current of a different frequency at said second station, a signalling line connecting said stations, a chain of selecting relays at each of said stations operated sequentially by the equivalent relays of said first-mentioned relay chains, means controlled by said selecting relays when energized in synchronism for alternately associating said sources of alternating current with said signalling line, and means controlled by the alternate association of said sources of alternating current with said signalling line for operating the first-mentioned relay chains at said first and second stations sequentially and in synchronism with each other.

9. In a signalling system, a first station, a second station, apparatus units at said second station, signalling devices individual thereto at said first station, a signalling line connecting said stations, a chain of relays at each of said stations for sequentially associating said apparatus units and their associated signalling devices with said signalling line simultaneously while said relays are being operated in synchronism, sources of alternating current of individual frequency, means controlled by the synchronous operation of said relay chains for sequentially applying said sources of alternating current to said signalling line and means responsive to the application of said sources to said signalling line for operating said chains of relays in synchronism, means including a source of individual frequency for operating any one of said apparatus units whenever it is associated with said signalling line and means including a source of alternating current of individual frequency for operating the signalling device individual to said apparatus unit over said signalling line when said signalling device is associated with said signalling line.

In testimony whereof, I have hereunto subscribed my name this 28th day of May, 1924.

THOMAS U. WHITE.